United States Patent [19]

Eggers

[11] 4,280,320
[45] Jul. 28, 1981

[54] TENSIONING APPARATUS

[75] Inventor: Edward T. Eggers, New Holland, Pa.

[73] Assignee: Sperry Corporation, New Holland, Pa.

[21] Appl. No.: 936,964

[22] Filed: Aug. 25, 1978

[51] Int. Cl.³ ............................................. A01D 39/00
[52] U.S. Cl. ........................................ 56/341; 100/88
[58] Field of Search ................... 56/341, 343; 100/88, 100/76; 242/18 R, DIG. 3, 86.5 R; 267/61 R, 61 S

[56] References Cited

U.S. PATENT DOCUMENTS

| | | | |
|---|---|---|---|
| 575,451 | 1/1897 | Yost | 267/61 |
| 1,027,393 | 5/1912 | Brown | 100/76 |
| 2,850,964 | 9/1958 | Harrer | 56/341 |
| 2,868,113 | 1/1959 | Harrer | 56/341 |
| 3,895,573 | 7/1975 | Phillips et al. | 100/88 |
| 3,931,702 | 1/1976 | Soteropulos et al. | 56/341 |
| 3,964,246 | 6/1976 | Kopasha | 56/341 |
| 4,016,712 | 4/1977 | Gaeddert | 56/341 |
| 4,026,205 | 5/1977 | Blanshine et al. | 100/88 |
| 4,137,697 | 2/1979 | Knapp et al. | 56/341 |

*Primary Examiner*—Jay N. Eskovitz
*Attorney, Agent, or Firm*—James R. Bell; Frank A. Seemar; Larry W. Miller

[57] ABSTRACT

In a crop roll forming machine having a mobile frame, a pickup, a crop material conveying apparatus, a bale forming apparatus, and a bale forming region defined generally by the bale forming apparatus and the frame there is provided an improved tensioning apparatus for the bale forming apparatus comprising at least a first and a second spring extensibly affixed to mounting structure at a first end and connected to the bale forming apparatus at a second end. The springs further have an easily adjustable tension adjustment so that a resistive force to the extension of the springs is generated in direct relationship to the adjustments made to the tension adjustment; the resistive force being transmitted to the bale forming apparatus at the second end thereby providing an adjustably increasing tension to the bale forming apparatus and correspondingly adjustably increasing the force exerted upon crop material being formed into a bale in the bale forming region.

9 Claims, 8 Drawing Figures

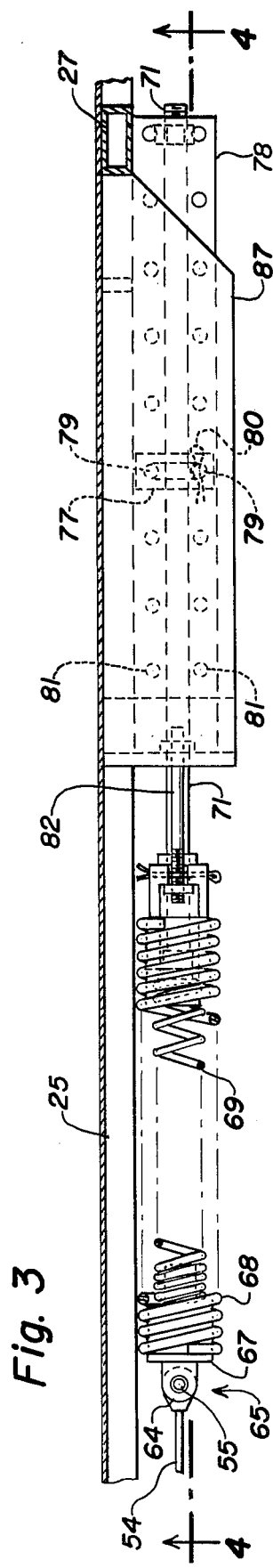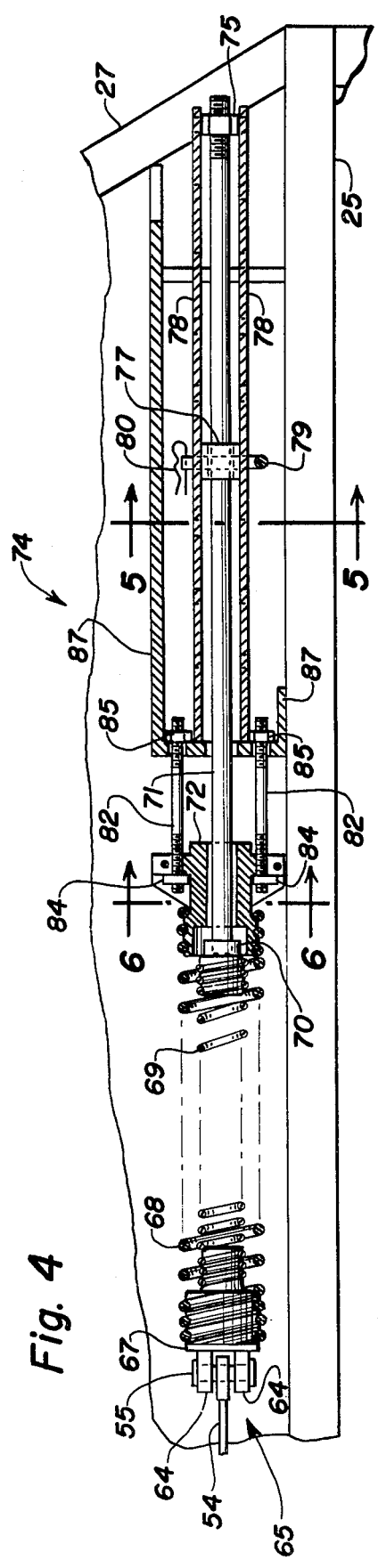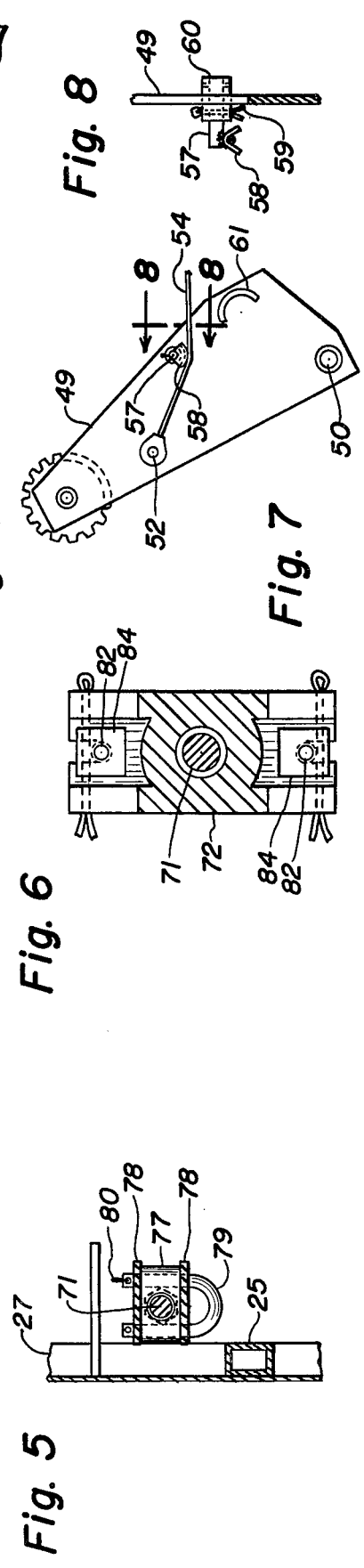

TENSIONING APPARATUS

BACKGROUND OF THE INVENTION

This invention is concerned generally with crop roll forming machines. Specifically, it is addressed to an improved tensioning apparatus for the bale forming means of a crop roll forming machine that is easily adjustable and permits variable tension to be applied to the bale forming means under appropriate crop conditions from the time a bale is initially formed until it is a completed crop material package.

Historically, it has been the custom to harvest forage crops by mowing the crops, letting them dry in the field, forming the dried crop material into windrows and passing a hay-baling machine over and along those windrows to form the crop material into rectangular bales. This technique suffers from the disadvantage, however, of having to gather the rectangular bales from the field and transport them to a storage area protected from the elements since rectangular bales exposed to precipitation will retain sufficient moisture to rapidly spoil and consequently be useless for forage purposes.

A former practice utilized a hay-baling machine that gathered the dried, precut crop material from the field and formed it into small diameter cylindrical bales. Although this practice produced a crop material package that had a shaped surface that would tend to shed the moisture produced by inclement weather, it suffered from the same basic disadvantage as the rectangular baling procedure since spoilage occurs to the outer layer of the crop roll. Since the depth of spoilage of the outer layer in relation to the overall diameter of these small crop rolls was relatively great, it was not economically practical to expose these small diameter rolls to the weathering process. Therefore, these rolls also had to be removed from the field to a protected storage area.

Recent practice has shown that the formation of crop materials into large compact rolls, rather than rectangular bales or small rolls as formerly done, permits the crop material to be deposited in roll form and left in fields for extended periods of time since the rolled material tends to provide a self-shredding protective covering from inclement weather. The depth of what spoilage that does occur in relation to the overall diameter of such a roll is minimal and, therefore, storage in exposed areas is practical. The ability to leave these rolled bales in fields thus obviates the additional steps of gathering the rectangular bales or small diameter crop rolls and transporting them to a storage area protected from the elements. The practice of forming large round bales of crop forage material has become increasingly popular since it is labor extensive and has proven to be a commercially feasible and lucrative practice for relatively small scale farms, as well as large custom hay operations.

This increasing popularity of large crop roll forming machines has been manifested in their broadened use from rolling wintering forage for livestock to rolling high protein crops, such as alfalfa, for dairy livestock. Concomitantly, these large crop roll forming machines have been used in a wider range of crop materials and under a wider range of crop conditions.

There are generally two principal types of large crop roll forming machines on the market today. These types are determined by the nature of the bale forming means utilized. This apparatus employs either a series of endless belts or a combination of chains and slats of some type to encompass the crop material. The bale forming means generally determines the density of the forming crop roll by expanding with the bale under predetermined amounts of tension while additional crop material is wrapped about the bale. Examples of these types of machines embodying these different bale forming means are shown in U.S. Pat. No. 3,722,197 dated Mar. 27, 1973, and in U.S. Pat. No. 3,859,909 to Mast dated Jan. 14, 1975.

Machines of the type just described have been continually faced with dual, and sometimes antithetical, areas of concern by having to offer good core formation characteristics and still produce bales of relatively high density. A large round bale's density primarily is a function of the amount of tension that is applied to the bale forming means which causes compressive forces to be applied to the bale along the surface of contact of the bale forming means therewith. During the initial stage of the bale forming process the center of the roll bale, or core, is formed. Excessive compressive forces caused by too much tension being applied to the bale forming means can cause the core to breakup. This is especially true in short, brittle and dry crops such as straw, maize butts or corn stover, where the crops will merely crumble under excessive pressure as the core grows and engages the resistive mold of the bale forming means. The fact that different crops require different core formation compressive forces to initiate the roll forming process makes difficult the manufacture of a single large crop roll forming machine for all crops and all the different types of crop conditions that can be encountered. Indeed, many commercial balers today consistently can form round bales in only a portion of the crops used for forage because of this. Additionally, after the core is formed the need to satisfy the demand for higher density bales presents the contrasting problem of having to apply an increasingly greater tension force to the bale forming means. Therefore, the need for a machine that will operate in a wide range of crops under a broad spectrum of crop conditions requires an easily adjustable tensioning apparatus for a bale forming means in a large crop roll forming machine that can be tailored to the specific crop conditions in the particular crop being rolled during core formation, as well as provide a generally increasing tension on the bale forming means during the remainder of the bale forming process.

The foregoing problems are solved in the design of the machine comprising the present invention by utilizing an improved tensioning apparatus for the bale forming means of a crop roll forming machine that is easily adjustable to permit the required appropriate level of tension to be applied to the bale forming means initially to form the core of a large round bale for each particular crop material being rolled, as well as providing the generally increasing tension needed to form crop material packages of the desired density.

SUMMARY OF THE INVENTION

It is an object of the present invention to provide an improved tensioning apparatus for the bale forming means of a crop roll forming machine that permits easily selectable levels of tension to be applied to the bale forming means, and hence a corresponding compressive force to the bale, gradually and in an incremental fashion so that a bale core can be formed consistently even with difficult crops and under difficult crop conditions and the tensioning apparatus still will produce a high density crop material package.

It is another object of the present invention to provide an improved tensioning apparatus for the bale forming means of a crop roll forming machine that is easily adjusted without the use of any tools.

It is a further object of the invention to provide an improved tensioning apparatus for the bale forming means of a crop roll forming machine that will be able to provide a selectably wide range of tensions to the bale forming means.

It is still another object of the present invention to provide an improved tensioning apparatus for the bale forming means of a crop roll forming machine that will be compact in size.

It is another object of the invention to provide an improved tensioning apparatus for the bale forming means of a crop roll forming machine that will permit the roll forming machine to effectively function in the full range of forage crop materials.

These and other objects and advantages are obtained by providing in a crop roll forming machine having a mobile frame, a pickup, a crop conveying means, a bale forming means, and a bale forming region defined generally by the bale forming means and the frame an improved tensioning apparatus for the bale forming means comprising spring means extensibly affixed to mounting means at a first end and connected to a bale forming means at the second end. The spring means further has easily adjustably tension adjustment means so that a resistive force to the extension of the spring means is generated in direct relationship to the adjustments made to the adjustment means; the resistive force being transmitted to the bale forming means at the second end thereby providing an adjustably increasing tension to the bale forming means and correspondingly adjustably increasing the force exerted upon crop material being formed into a bale in the bale forming region.

BRIEF DESCRIPTION OF THE DRAWINGS

The advantages of this invention will become apparent upon consideration of the following detailed disclosure of the invention, especially when it is taken in conjunction with the accompanying drawings, wherein:

FIG. 3 is a top plan view of the tension springs and the tension adjustment means of the tensioning apparatus.

FIG. 4 is a side elevation of a section of the tensioning springs and tension adjustment means taken along the line 4—4 of FIG. 3.

FIG. 5 is an end view of the tension adjustment means stop block taken along the line 5—5 of FIG. 4.

FIG. 6 is an enlarged end view of the spring mounting means taken along the line 6—6 of FIG. 4.

FIG. 7 is an enlarged view of the spring cable and adjustable pin tensioning system shown in FIG. 1 when the tensioning apparatus is under a no load condition.

FIG. 8 is an enlarged end view of a section of the adjustable pin and pin mounting plate taken along the line 8—8 of FIG. 7.

DETAILED DESCRIPTION OF THE PREFERRED EMBODIMENT

Figure 1:
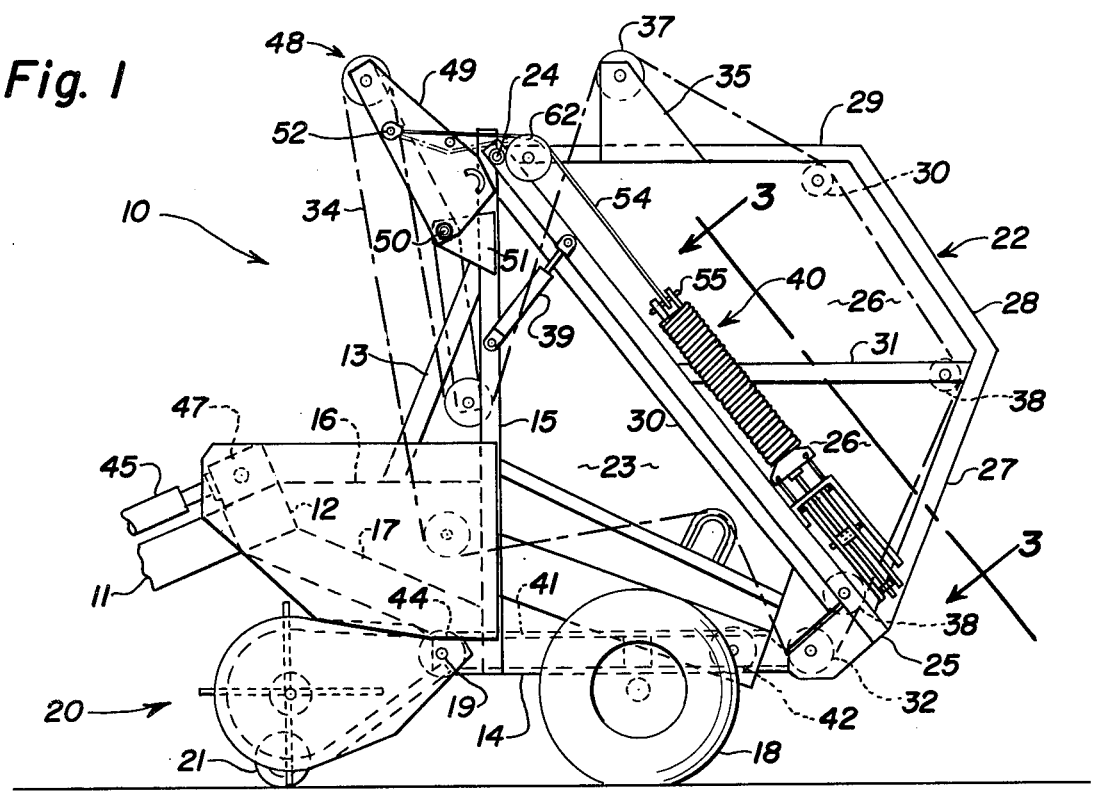
FIG. 1 is a side elevation of a roll forming machine illustrating the tensioning apparatus when it is not under a bale forming load.

FIG. 1 shows a crop roll forming machine 10 adapted to be towed by a prime moving vehicle, such as a tractor (not shown) which is connected to the front end of hitch beam 11. The hitch beam 11 is fastened to transverse support beam 12 that is a part of the main frame of the machine 10. The main frame consists briefly of bottom horizontal members 14 which are fastened to vertical support members 15 on each side of the machine 10. Transverse support beam 12 is supported by and fastened to connecting member 17, which is in turn fastened at its opposing end to support members 14 and 15, respectively. Diagonal member 13 connects vertical support member 15 and horizontal beam element 16 at the front of the machine 10. The crop roll forming machine 10 is mounted on a pair of wheels 18, only one of which is shown. The forwardmost end of horizontal support member 14 has a pivot point 19, at which is attached a crop material pickup, indicated generally by the numeral 20. The pickup 20 is guided along the ground by flotation wheels 21.

The roll forming machine 10 has an upper frame comprised of a tailgate, indicated generally by the numeral 22, which is pivotally affixed at location 24 in suitable fashion to the upper portions of vertical support members 15. The tailgate 22 is comprised of a series of interconnected tailgate frame members 25, 27, 28 and 29. Frame member 25 is parallel to and coincident with angled support member 30 of the main frame. Frame member 25 is connected to support member 27 by bracing member 31. At its lowest portion tailgate 22 has an elongation within which is mounted a rotatable idler 32 about which passes a bale forming means or upper apron 34. At the top of the tailgate 22 and on each side is a support bracket 35 into which is mounted a rotatable idler 37 for the upper apron 34. Between idlers 32 and 37 are a series of idlers 38 about which the upper apron passes as it moves in a predetermined path about the roll forming machine 10 during the roll forming process. The tailgate 22 is raised and lowered about its pivot location 24 by hydraulic cylinders 39 located on each side of the machine 10. Cylinder 39 is suitably affixed to vertical support member 15 at its cylinder end and to tailgate frame member 25 at its opposing rod end. Overlying and parallel to tailgate frame member 25 is the spring upper apron tensioning apparatus, indicated generally by the numeral 40.

The sides of both the main frame and the tailgate 22 of the roll forming machine 10 are covered with steel shielding, 23 and 26, respectively, fastened to the interior side of the support members of the machine.

Crop material retrieved from the field by the pickup 20 is delivered onto a conveyor or endless lower apron 41 which carries the crop material to the bale forming region within the roll forming machine 10. The lower apron 41 passes about a drive sprocket 42 on a front idler sprocket 44. The power to drive both the upper apron 34 and the lower apron 41, as well as the pickup 20, is transferred from the power takeoff shaft 45 through a gearbox 47 and a series of sprockets, sheaves and belts (not shown). The general structure of the crop roll forming machine 10 is not described herein in further detail since it is old and known in the art. A more detailed description of the type roll forming machine described herein is illustrated in U.S. Pat. No. 3,859,909 to Mast, dated Jan. 14, 1975. The improved upper apron tensioning apparatus shall be discussed in greater detail hereafter.

The upper apron 34 is played out about the expanding diameter of a large round crop roll R by means of the auxiliary frame or serpentine system indicated generally by the numeral 48. The auxiliary frame 48 is seen in its unextended position in FIG. 1 and in its fully extended position in FIG. 2 with a substantially completed crop roll R in the roll forming machine 10. The auxiliary frame 48 is not described in further detail at this time since it is old in the art and shown in greater detail and more fully described in prior U.S. Pat. No. 4,026,205 issued May 31, 1977, to Blanshine et al., hereinafter specifically incorporated by reference. The auxiliary frame or serpentine 48 has a mounting bracket 49 on each side of the roll forming machine 10 that is pivotally affixed at location 50 in suitable fashion to support brakcet 51. Support bracket 51 is suitably fastened to the upper portion of the vertical support member 15. Bracket 49 has a fastener 52 mounted therein and to which is attached one end of the cable 54. At that end cable 54 has a suitable attachment to permit its being secured to fastener 52. On the opposing end cable 54 is suitably connected to fastening pin 55 of the spring upper apron tensioning apparatus 40.

Mounting bracket 49 has positioned generally medially and along its upper edge a cable guide 57, best shown in FIGS. 7 and 8. Cable guide 57 has an angled track 58 fixedly fastened thereto which permits the cable 54 to remain in place during operation. As best seen in FIG. 8, cable guide 57 is readily removable from mounting bracket 49 by means of a pin 59. Cable guide 57 has fitted about a portion of its periphery a sleeve 60 with appropriate apertures aligned with corresponding apertures in cable guide 57 through which pin 59 is inserted. Extracting pin 59 permits the guide to be removed and reinserted with the track portion 58 oriented towards the interior of the roll forming machine 10. The cable guide 57 is longer on the end with the track 58 so that when the track 58 is oriented to the interior of the machine, the cable 54 does not contact the guide 57. The cable 54 then assumes the path illustrated in FIG. 1, passing above the guide 57. Tension-wise, this causes in an increase in the initial tension on the upper apron 34 until the bale reaches a predetermined diameter and the serpentine 48 has rotated sufficiently in a counterclockwise direction so that the cable 54 is resting on the cam support 61, best shown in FIG. 2. This initial increase in tension on the upper apron 34 is the result of a lengthened lever arm taken from the pivot point 50 to the cable 54.

Figure 2:
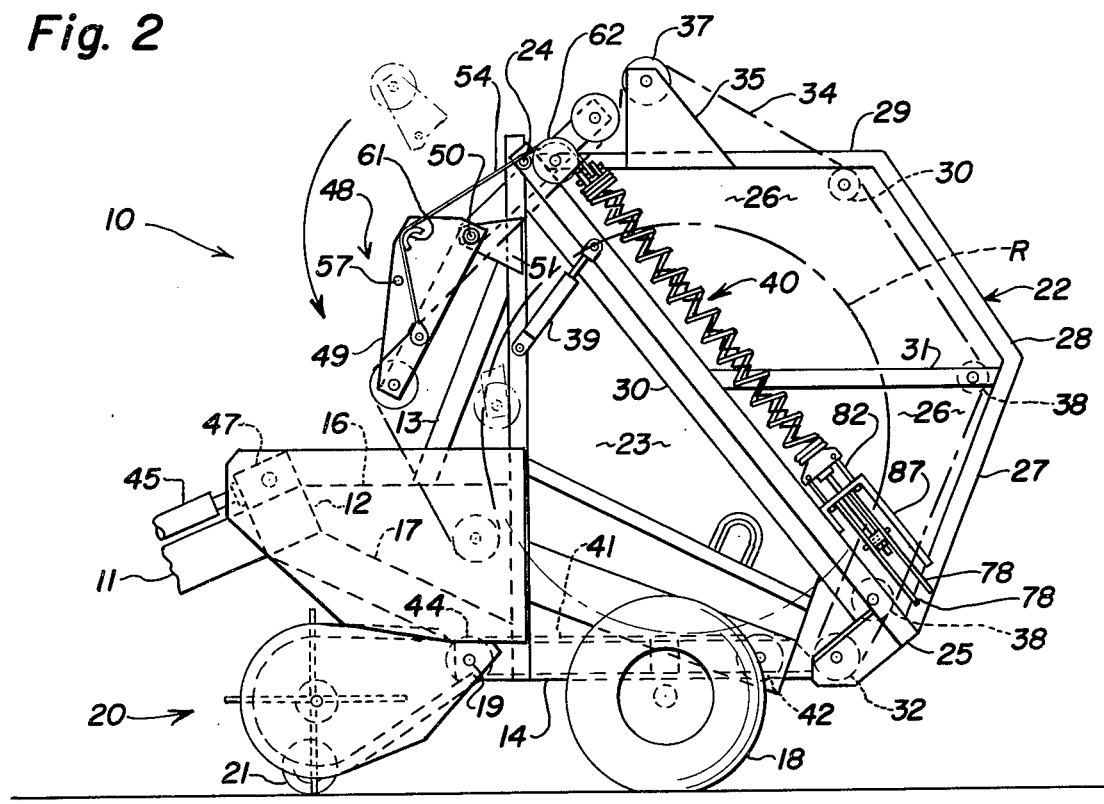
FIG. 2 is a side elevation of a roll forming machine illustrating the tensioning apparatus and the roll forming machine when a nearly completed crop material package is in the bale forming region and the tensioning apparatus is under a bale forming load.

When the cable guide 57 is oriented with the cable track extending outwardly from bracket 49, the cable 54 runs beneath the guide and within the cable track 58, as shown in phantom in FIG. 1 and in isolation in FIG. 7. In this configuration, there is an initial decrease on the upper apron 34 until the bale reaches a predetermined diameter, when the cable 54 would again be supported by cam support 61, as shown in FIG. 2. The predetermined bale diameter when the effect of the cable guide 57 becomes negligible on the upper apron tension has proved to be approximately three feet. This initial decrease in tension is the result of a shortened lever arm taken from the pivot point 50 to the cable 54. This particular adjustment to the cable guide 57 affects the tension on the upper apron 34, and therefore, the density of the roll or bale R, only during the core forming stage of the bale. Once the crop roll has been formed beyond the core stage, the serpentine 48 will have rotated sufficiently in a counterclockwise direction to have the cable 54 rest on the cam support 61 and the amount of tension in the upper apron 34 will be determined primarily by the spring upper apron tensioning apparatus 40.

As previously mentioned, the cable 54 extends from a fastener 52 about a rotatable pulley 62 to the fastener pin 55 mounted to the top of the spring upper apron tensioning apparatus 40. Fastening pin 55 is inserted through appropriately sized apertured in the arm 64 of connecting means 65, best shown in FIGS. 4 and 5. The base portion 67 of connecting means 65 is securely fastened to the top ends of concentrically aligned springs, 68 and 69, respectively. Connecting means 65 is typically a spring nut with two separate outer diameters that are threaded and screwed directly into outer spring 68 and inner spring 69. The opposing end of inner spring 69 is connected to a threaded plug 70, shown best in FIG. 4. Adjusting rod 71 is fixedly fastened to threaded plug 70 and extends downwardly through the center of the casted spring nut 72. Adjusting rod 71 extends down the center of the mounting assembly 74, which is fastened in an appropriate manner, such as by welding, to the side shielding 26 and the tailgate frame members 25 and 27 of the tailgate 22. At the extreme opposing end of rod 71 is a stop nut 75 that is fixedly fastened thereto, such as by welding. Rod 71 passes through an appropriately sized aperture in stop block 77 that is affixable in various locations along the guide tracks 78 of mounting assembly 74.

Stop block 77 consists of a U-shaped pin 79 with ends that are insertable through appropriately sized opposing apertures 81 in block 77 and guide tracks 78. The ends of U-shaped pin 79 have openings to allow the insertion of locking pins 80. The sets of paired apertures 81 in the guide tracks 78 are best shown in FIG. 3. The particular diameter of the bale R at which the added tension of the inner spring 69 becomes effective can be varied from approximately 20 inches to 40 inches by the selective positioning of the stop block 77 in the desired pair of apertures 81.

Casted spring nut 72 has an outer diameter which permits it to be screwed within the outer spring 68. The casted spring nut 72 is fastened to the spring mounting assembly 74 by means of a pair of bolts 82 threaded on both ends. The bolts 82 are retained by locking nuts 84 in casted spring nut 72 on the upper side and mounting assembly plates 87 of spring mounting assembly 74 by locking nuts 85. The apertures in spring nut 72 through which the bolts 82 pass may either be bored or, as shown in FIG. 7, slotted and retained against lateral movement by cotter pins.

In operation the crop roll forming machine 10 is pulled across a field by a towing vehicle, such as a tractor. Precut and dried crop material formed into windows or swaths is picked up from the field by the pickup 20 and delivered to the lower apron 41 where it is carried rearwardly into contact with the upper apron 34. Thus within the bale forming region, the counter-rotational movement of the upper apron 34 and the lower apron 41 imparts a rotational movement to the crop material being baled. As the core of the bale R is started, additional tension is selectively applied to or removed from the upper apron 34 by the placement of the cable guide 57 so that it either protrudes interiorly toward the center line of the roll forming machine or protrudes outwardly from the side of the machine 10.

When the cable guide 57 is inserted so that it protrudes outwardly from the side of the machine 10, the guide engages the cable 54 decreasing the amount of tension transmitted from the outer spring 68 to the upper apron 34 by shortening the length of the lever arm. When the guide protrudes inwardly towards the center line of the roll forming machine 10, the lever arm is lengthened and the initial tension on the core is increased.

As the core forms, the bale R continues to expand. The expansion of the bale R and the density of the rolled material is directly in proportion to the amount of tension applied to the upper apron 34 primarily by the resistive force of the spring upper apron tensioning apparatus 40. This resistive force is transferred through the cable 54 to the auxiliary frame or serpentine 48 about which the upper apron 34 passes. The outer spring 68 continuously exerts a resistive force to the expansion of the diameter of the bale R as the serpentine 48 plays out more of the upper apron 34 about the expanding bale R. The inner spring 69 adds a further resistive force to this bale expansion based upon the placement of the stop block 77 along the guide tracks 78. The adjusting rod 71 with its stop nut 75 moves upwardly as the outer spring 68 expands. This upward movement is in response to the unresisted movement of the inner spring 69 upwardly. The inner spring 69 offers added resistance to the expansion of the bale R only when the stop nut 75 engages the stop block 77 at the predetermined location. The point at which the stop block is positioned determines the point at which the upper apron 34 comes under additional tension. The total tension exerted upon the upper apron 34 is the cumulative total of both inner spring 69 and outer spring 68. This tension subsequent to the engagement of the stop block 77 by the nut 75 results in a compressive force on the bale at the upper apron's points of contact with the bale R and is the greatest single factor affecting bale density. Thus, the amount of tension applied to the bale forming means 34 is easily adjustable and can be varied so as to lessen the amount of tension initially applied to a bale being formed and increase proportionately at a rate consistent with the desired density to be achieved in a completed crop roll or bale R.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangement of parts which will occur to one of skill in the art upon a reading of the disclosure.

It should be noted further that varying degrees of tension can be applied to the upper apron 34 during the initial core formation by including a number of openings in the mounting brackets 49 into which the cable guides 57 may selectively be placed. It also should be noted that the effects of the spring upper apron tensioning apparatus 40 and the cable guide 57 on the upper apron 34 can be either joint or several dependent upon the desires of the farmer, the crop being rolled and the crop conditions.

Having thus described the invention, what is claimed is:

1. An improved tensioning apparatus for a bale forming means of a crop roll forming machine having a mobile frame, a pickup, a crop material conveying means, a bale forming means, and a bale forming region defined generally by the bale forming means and the frame, the improvement comprising:

spring means having a first end and an opposing second end, the spring means being extensibly affixed to mounting means at the first end and connected to the bale forming means at the second end, the spring means further having easily adjustable tension adjustment means comprising at least a first means and a second means, the first means being intermediate of the bale forming means and the second end of the spring means so that a resistive force is generated to the extension of the spring means in direct relationship to the adustments made to the adjustment means, the resistive force being transmitted to the bale forming means at the second end thereby providing an adjustably increasing tension to the bale forming means and correspondingly adjustably increasing the force exerted upon the crop material being formed into a bale in the bale forming region;

the spring means further comprising at least a first spring and a second spring, the first spring being connected to the second spring and the second adjustment means and via the first adjustment means to the bale forming means so that the resistive force and the resulting tension exerted upon the bale forming means is generated substantially by the first spring until the bale expands to a predetermined size where the resistive force and resulting tension are generated jointly by the first spring and the second spring;

the first and second springs being concentrically mounted coil springs operably affixed to the adjustment means at the first end on each side of the frame mounted so that the second spring is slidably movable within the first spring until the bale expands to the predetermined size; and an adjustment pin and an elongate cable having a first end connectable to the first spring and the second spring, and a second end connectable to the bale forming means defining a path therebetween, the adjustment pin being insertable into predetermined positions in the frame adjacent the second end to vary the tension exerted upon the initial crop material being formed into a bale in the bale forming region when the cable is carried thereagainst, thereby altering the path of the cable between the first end and the second end.

2. The tensioning apparatus according to claim 1, wherein the second adjustment means is connected to the mounting means and further includes a pair of guide tracks spaced equidistantly from an adjustment rod having a first and a second end, the guide tracks having a predetermined number of spaced apart paired apertures therein, the first end of the adjustment rod being fastened to the second spring, the second end of the adjustment rod having stop means affixed thereto.

3. The tensioning apparatus according to claim 2, wherein the second adjustment means further includes retaining means, the retaining means being insertable into a stop block and the paired apertures of the guide tracks, the stop block being mounted about the adjustment rod and freely movable therealong and positionable by the retaining means at locations corresponding to the paired apertures so that the adjustment rod passes through the stop block as the first spring expands in response to crop material being formed into a bale until the stop means engages the stop block whereupon the second spring generates a resistive force that increases the total resistive force initially exerted by the first spring on the bale forming means.

4. An improved tensioning apparatus for the bale forming means of a crop roll forming machine having a frame, a pickup, a crop material conveying means, a bale forming means and a bale forming region defined generally by the bale forming means and the frame, the improvement comprising:

first and second coil springs having a first end and an opposing second end, the springs being extensibly mounted to mounting means at the first end and being commonly connected to the bale forming means at the second end, the springs further being positioned about a common longitudinal axis and having an easily adjustable tension adjustment means such that a resistive force to the extension of the springs is generated in direct relationship to the adjustments made to the adjustment means whereby only one of the springs initially generates a resistive force that is transmitted to the bale forming means at the second end thereby providing an adjustably increasing tension to the bale forming means and correspondingly adjustably increasing the force exerted upon the crop material being formed into a bale in the bale forming region;

the first spring being connected to the adjustment means and the bale forming means so that the resistive force and the resulting tension exerted upon the bale forming means is generated substantially by the first spring until the bale expands to a predetermined size where the resistive force and resulting tension are generated by the first spring and the second spring; and an adjustment pin and an elongate cable having a first end connectable to the first spring and the second spring, and a second end connectable to the bale forming means defining a path therebetween, the adjustment pin being insertable into predetermined positions in the frame adjacent the second end to vary the tension exerted upon the initial crop material being formed into a bale in the bale forming region when the cable is carried thereagainst, thereby altering the path of the cable between the first end and the second end.

5. The tensioning apparatus according to claim 4, wherein the mounting means further includes a pair of guide tracks spaced equidistantly from an adjustment rod having a first and a second end, the guide tracks having a predetermined number of spaced apart paired apertures therein, the first end of the adjustment rod being fastened to the second spring, the second end of the adjustment rod having stop means affixed thereto.

6. The tensioning apparatus according to claim 5, wherein the adjustment means further includes retaining means, the retaining means being insertable into a stop block and the paired apertures of the guide tracks, the stop block being mounted about the adjustment rod and freely movable therealong and positionable by the retaining means at locations corresponding to the paired apertures so that the adjustment rod passes through the stop block as the first spring expands in response to crop material being formed into a bale until the stop means engages the stop block whereupon the second spring generates a resistive force that increases the total resistive force initially exerted by the first spring on the bale forming means.

7. An improved tensioning apparatus for the bale forming means of a crop roll forming machine having a mobile frame, a pickup, a crop material conveying means, a bale forming means, and a bale forming region defined generally by the bale forming means and the frame, the improvement comprising:

at least a first spring and a second spring, each having a first end and an opposing second end, the first and second springs being extensibly affixed to the mounting means at the first end and connected to the bale forming means at the second end, the first and second springs further having easily adjustable tension adjustment means so that a resistive force is generated to the extension of the springs in direct relationship to the adjustments made to the adjustment means, the resistive force being transmitted to the bale forming means at the second end in such a manner that the resistive force and the resulting tension exerted upon the bale forming means is generated by the first spring until the bale expands into a predetermined size where the resistive force and resulting tension are generated jointly by the first spring and the second spring;

the first and second springs are concentrically mounted coil springs operably affixed to the adjustment means at the first end on each side of the frame; and an adjustment pin and an elongate cable having a first end connectable to the first spring and the second spring and a second end connectable to the bale forming means defining a path therebetween, the adjustment pin being insertable into predetermined positions in the frame adjacent the second end to vary the tension exerted upon the initial crop material being formed into a bale in the bale forming region when the cable is carried thereagainst, thereby altering the path of the cable between the first end and the second end.

8. The tensioning apparatus according to claim 7, wherein the adjustment means further includes a pair of guide tracks spaced equidistantly from an adjustment rod having a first and a second end, the guide tracks having a predetermined number of spaced apart paired apertures therein, the first end of the adjustment rod being fastened to the second spring, the second end of the adjustment rod having stop means affixed thereto.

9. The tensioning apparatus according to claim 8, wherein the adjustment means further includes retaining means, the retaining means being insertable into a stop block and the paired apertures of the guide tracks, the stop block being mounted about the adjustment rod and freely movable therealong and positionable by the retaining means at locations corresponding to the paired apertures so that the adjustment rod passes through the stop block as the first spring expands in response to crop material being formed into a bale until the stop means engages the stop block whereupon the second spring generates a resistive force that increases the total resistive force initially exerted by the first spring on the bale forming means.

* * * * *